(12) United States Patent
Saeki

(10) Patent No.: US 9,398,504 B2
(45) Date of Patent: Jul. 19, 2016

(54) MOBILE COMMUNICATION SYSTEM, WIRELESS STATION, MOBILE COMMUNICATION CONTROL METHOD, AND NON-TRANSITORY COMPUTER-READABLE MEDIUM STORED WITH MOBILE COMMUNICATION CONTROL PROGRAM

(71) Applicant: NEC Corporation, Tokyo (JP)

(72) Inventor: Tomoyuki Saeki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/415,840

(22) PCT Filed: Apr. 10, 2013

(86) PCT No.: PCT/JP2013/002429
§ 371 (c)(1),
(2) Date: Jan. 20, 2015

(87) PCT Pub. No.: WO2014/013646
PCT Pub. Date: Jan. 23, 2014

(65) Prior Publication Data
US 2015/0189562 A1 Jul. 2, 2015

(30) Foreign Application Priority Data
Jul. 17, 2012 (JP) .................................. 2012-158616

(51) Int. Cl.
*H04W 36/08* (2009.01)
*H04W 16/32* (2009.01)
(Continued)

(52) U.S. Cl.
CPC .............. *H04W 36/08* (2013.01); *H04W 16/32* (2013.01); *H04W 36/22* (2013.01); *H04W 36/36* (2013.01); *H04W 36/04* (2013.01); *H04W 84/045* (2013.01)

(58) Field of Classification Search
CPC ..... H04W 36/24; H04W 36/04; H04W 36/08; H04W 36/36

USPC ......... 455/3.04, 435.1–3, 436–439, 443, 444; 370/331–331
See application file for complete search history.

(56) References Cited

U.S. PATENT DOCUMENTS 6,041,235 A 3/2000 Aalto
7,200,401 B1 4/2007 Hulkkonen
(Continued)

FOREIGN PATENT DOCUMENTS

EP 1300040 A1 4/2003
EP 2086246 A1 8/2009
(Continued)

OTHER PUBLICATIONS

Japanese Office Action dated Nov. 17, 2015, with English Translation; Application No. 2014-525684.
(Continued)

*Primary Examiner* — Cong Tran
(74) *Attorney, Agent, or Firm* — Young & Thompson

(57) ABSTRACT

A mobile communication system (9) of the invention is provided with a first wireless base station (91) managing a macro cell, a second wireless base station (92) managing a small cell included in the macro cell, and a service establishment control unit (93) executing a service establishment control of establishing a service between a mobile terminal and the first wireless base station (91) in the macro cell in response to a request of establishing a service from the mobile terminal. When the service whose establishment is requested from the mobile terminal is a specific service, the service establishment control unit (93) executes a handover control of the mobile terminal from the first wireless base station (91) to the second wireless base station (92), and then, executes a service establishment control of establishing a service between the mobile terminal and the second wireless base station (92) in the small cell.

14 Claims, 11 Drawing Sheets

(51) Int. Cl.
*H04W 36/22* (2009.01)
*H04W 36/36* (2009.01)
*H04W 36/04* (2009.01)
*H04W 84/04* (2009.01)

(56) References Cited

U.S. PATENT DOCUMENTS

| | | | |
|---|---|---|---|
| 7,286,826 B2 | 10/2007 | Kim et al. | |
| 7,769,382 B2 | 8/2010 | Rasanen | |
| 8,306,535 B2 | 11/2012 | Masuda | |
| 8,731,559 B2* | 5/2014 | Shi | H04W 36/0055 370/331 |
| 8,787,911 B2 | 7/2014 | Johnstone et al. | |
| 8,886,198 B2* | 11/2014 | Tinnakornsrisuphap | H04W 36/04 455/436 |
| 9,037,134 B2* | 5/2015 | Grob | H04W 36/04 370/310.2 |
| 2002/0087674 A1 | 7/2002 | Guilford | |
| 2004/0166863 A1 | 8/2004 | Kim et al. | |
| 2007/0237126 A1 | 10/2007 | Pirila | |
| 2008/0064405 A1 | 3/2008 | Rasanen | |
| 2010/0278141 A1* | 11/2010 | Choi-Grogan | H04W 36/0083 370/331 |
| 2010/0309802 A1 | 12/2010 | Masuda et al. | |
| 2011/0039551 A1 | 2/2011 | Tsuboi et al. | |
| 2012/0214495 A1* | 8/2012 | Choi | H04W 36/0055 455/444 |

FOREIGN PATENT DOCUMENTS

| | | |
|---|---|---|
| JP | H09512141 A | 12/1997 |
| JP | 2004-260824 | 9/2004 |
| JP | 2004349976 A | 12/2004 |
| JP | 2010-263449 | 11/2010 |
| JP | 2011-091629 | 5/2011 |
| WO | 0044189 A1 | 7/2000 |
| WO | WO 2009/063867 | 5/2009 |
| WO | WO 2009/133767 | 11/2009 |
| WO | WO 2011/018639 | 2/2011 |

OTHER PUBLICATIONS

Extended European Search Report (EESR) dated Feb. 16, 2016; Application No. 13819384.2.

Japanese Office Action dated Feb. 23, 2016; Application No. 2014-525684.

International Search Report, PCT/JP2013/002429, Jun. 25, 2013.

* cited by examiner

MOBILE COMMUNICATION SYSTEM, WIRELESS STATION, MOBILE COMMUNICATION CONTROL METHOD, AND NON-TRANSITORY COMPUTER-READABLE MEDIUM STORED WITH MOBILE COMMUNICATION CONTROL PROGRAM

TECHNICAL FIELD

The present invention relates to a mobile communication system, a wireless station, a mobile communication control method, and a non-transitory computer-readable medium stored with a mobile communication control program, and relates particularly to a technique of handover from a macro cell to a small cell.

BACKGROUND ART

In recent years, there has been progressed a study about a wireless communication network having a network configuration in which cells of different types and different sizes co-exist (hereinafter, called as a "heterogeneous network") in such a manner that a cell which is managed by a small wireless base station is overlaid on a macro cell which is managed by an ordinary wireless base station (e.g. Patent Literature 1).

CITATION LIST

Patent Literature

PTL 1: Japanese Laid-open Patent Publication No. 2011-91629

SUMMARY OF INVENTION

Technical Problem

There is an idea of providing, as a service to be established between a mobile terminal and a wireless base station, a specific service of establishing a bearer (a communication channel) occupying a broad band for a specific mobile terminal, from the specific mobile terminal to a wireless base station. However, there is a problem that, when a specific service occupying such a broad band is provided, the capacity of a cell may be reduced due to establishment of the specific service, so that it is difficult for other mobile terminals to establish a service.

In order to solve such a problem as described above, an object of the invention is to provide a mobile communication system, a wireless station, a mobile communication control method, and a mobile communication control program that can prevent an influence on the other mobile terminals due to establishment of a specific service by a mobile terminal.

Solution to Problem

A mobile communication system according to a first aspect of the invention is provided with a first wireless base station which manages a first cell; a second wireless base station which manages a second cell included in the first cell; and service establishment control unit which executes a service establishment control of establishing a service between the mobile terminal and the first wireless base station in the first cell in response to a request of establishing a service from the mobile terminal. The service establishment control unit executes a handover control of the mobile terminal from the first wireless base station to the second wireless base station, and then executes a service establishment control of establishing a service between the mobile terminal and the second wireless base station in the second cell, when the service whose establishment is requested from the mobile terminal is a specific service.

A wireless station according to a second aspect of the invention is provided with service establishment control unit which executes a service establishment control of establishing a service between a mobile terminal and a first wireless base station in a first cell managed by the first wireless base station in response to a request of establishing a service from the mobile terminal. The service establishment control unit executes a handover control of the mobile terminal from the first wireless base station to a second wireless base station, when the service whose establishment is requested from the mobile terminal is a specific service, and then executes a service establishment control of establishing a service between the mobile terminal and the second wireless base station in a second cell included in the first cell and managed by the second wireless base station.

A mobile communication control method according to a third aspect of the invention includes receiving a request of establishing a service from a mobile terminal; executing a service establishment control of establishing a service between the mobile terminal and a first wireless base station in a first cell managed by the first wireless base station; and when the service whose establishment is requested from the mobile terminal is a specific service in executing the service establishment control, executing a handover control of the mobile terminal from the first wireless base station to a second wireless base station, and then, executing a service establishment control of establishing a service between the mobile terminal and the second wireless base station in a second cell included in the first cell and managed by the second wireless base station.

A wireless communication control program according to a fourth aspect of the invention causes a computer to execute a process of receiving a request of establishing a service from a mobile terminal; and a process of executing a service establishment control of establishing a service between the mobile terminal and a first wireless base station in a first cell managed by the first wireless base station. In the process of executing the service establishment control, when the service whose establishment is requested from the mobile terminal is a specific service, a handover control of the mobile terminal from the first wireless base station to a second wireless base station is executed, and then, a service establishment control of establishing a service between the mobile terminal and the second wireless base station is executed in a second cell included in the first cell and managed by the second wireless base station.

Advantageous Effects of Invention

According to the respective aspects of the invention as described above, it is possible to provide a mobile communication system, a wireless station, a mobile communication control method, and a mobile communication control program that can prevent an influence on the other mobile terminal due to establishment of a specific service by a mobile terminal.

DESCRIPTION OF EMBODIMENTS

First Exemplary Embodiment

Figure 1:
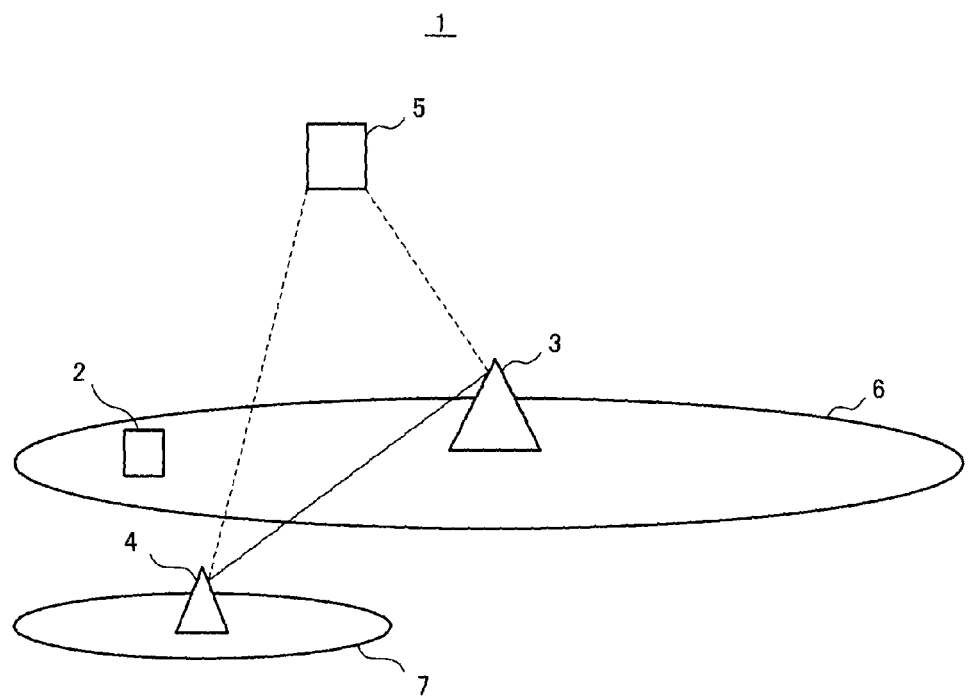
FIG. 1 is a conceptual diagram illustrating a configuration of a mobile communication system in a first exemplary embodiment of the invention.

First, a configuration of a mobile communication system 1 in a first exemplary embodiment of the invention will be described referring to FIG. 1. FIG. 1 is a conceptual diagram illustrating the configuration of the mobile communication system 1 in the first exemplary embodiment of the invention.

The mobile communication system 1 includes a mobile terminal 2, a wireless base station 3, a wireless base station 4, and a core network node 5. A mobile communication network which connects the respective components 2 to 5 in the mobile communication system 1 constitutes a heterogeneous network including a macro cell 6, and a small cell 7 which is disposed to overlay the macro cell 6. FIG. 1 illustrates that each of the components 2 to 7 is only one. However, the number of each of the components 2 to 7 is not limited to one.

The mobile terminal 2 requests the core network node 5 to establish a service via the wireless base station 3 or via the wireless base station 4, when establishing a service (a bearer associated with a service) in a mobile terminal network in order to transmit and receive data to and from the other terminal. "The other terminal" is, for instance, another mobile terminal 2, an information processing terminal (such as a server and a personal computer), or the like.

The wireless base station 3 manages the macro cell 6. In other words, the wireless base station 3 performs a control of establishing a service between the wireless base station 3, and the mobile terminal 2 staying in the macro cell 6 managed by the wireless base station 3. The wireless base station 3 transfers data to be transmitted and received between the mobile terminal 2 and the other terminal via a bearer established as a service.

In the exemplary embodiment, when the service whose establishment is requested from the mobile terminal 2 is a specific service, the wireless base station 3 executes a handover control of the mobile terminal 2 from the macro cell 6 (wireless base station 3) to the small cell 7 (wireless base station 4). In this way, when a bearer associated with a specific service is established, executing a handover control to the small cell 7 associated with the specific service, and transferring management of the mobile terminal 2 to the wireless base station 4 makes it possible to perform communication in the specific service, without affecting another mobile terminal 2 staying in the macro cell 6.

Examples of the specific service are the following services (1) and (2).

(1) A service occupying a broad band (e.g. a service of transmitting and receiving high-resolution video streaming, and the like).

(2) A service provided only in a specific cell (e.g. a game which can be played by a plurality of mobile terminals 2 only in one cell by mutual communication, or an information providing service and the like from a server which is accessible only from a specific cell and which requires user authentication).

The wireless base station 4 manages the small cell 7. The wireless base station 4 performs a control of establishing a service between the wireless base station 4, and the mobile terminal 2 staying in the small cell 7 managed by the wireless base station 4. The wireless base station 4 transfers data to be transmitted and received between the mobile terminal 2 and the other terminal via a bearer established as a service. The wireless base station 4 is a wireless base station smaller than the wireless base station 3 in size and capable of managing the small cell 7, which is smaller than the macro cell 6.

The core network node 5 controls the wireless base station 3 or the wireless base station 4 so that a service is established in response to a request of establishing the service from the mobile terminal 2. Examples of the core network node 5 are SGSN (Serving GPRS Support Node), MME (Mobility Management Entity), and the like.

Figure 2:
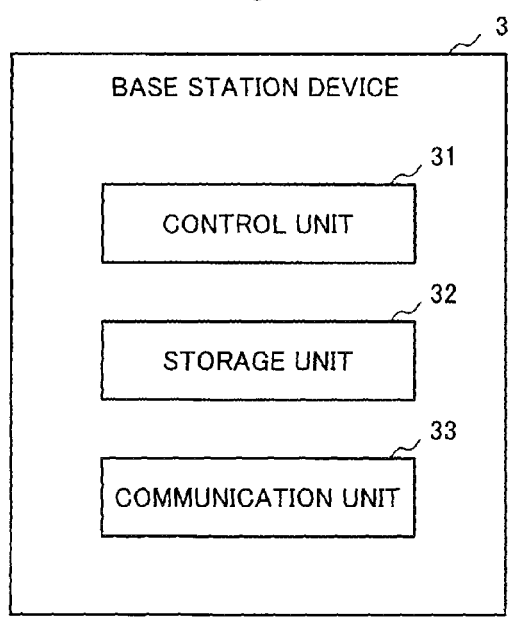
FIG. 2 is a block diagram illustrating a configuration of a wireless base station which manages a macro cell in the first exemplary embodiment of the invention.

Next, a configuration of the wireless base station 3 in the first exemplary embodiment of the invention will be described referring to FIG. 2. FIG. 2 is a block diagram illustrating a configuration of the wireless base station 3 in the first exemplary embodiment of the invention.

The wireless base station 3 includes a control unit 31, a storage unit 32, and a communication unit 33.

The control unit 31 integrally controls the wireless base station 3. Specifically, the control unit 31 is implemented by causing a CPU (Central Processing Unit) included in the control unit 31 to execute a program which causes the CPU to execute a process of integrally controlling the wireless base station 3.

The storage unit 32 is stored with various data to be used by the control unit 31, and a program and the like to be executed by the control unit 31. The storage unit 32 is constituted of one or more arbitrary storage devices capable of storing the data, the program, and the like. Examples of the storage device are a memory, a hard disk, and the like.

In the first exemplary embodiment, the storage unit 32 is stored with table information, as one of the various data. The table information is information, in which service type information representing the service type of a specific service, and small cell information representing the small cell 7 to which the specific service is provided are associated with each other. In other words, the control unit 31 is capable of specifying the small cell 7, to which a specific service whose establishment is requested from the mobile terminal 2 is provided, out of the small cells 7 included in the macro cell managed by the wireless base station 3, by referring to the table information. According to this configuration, by determining whether handover of the mobile terminal 2 to the specified small cell 7 is executable, the control unit 31 can determine whether a specific service is establishable by handover of the mobile terminal 2 which has requested establishment of a specific service to the small cell 7. The storage unit 32 manages the small cell information of the small cell 7 included in the macro cell 6 managed by the wireless base station 3, and the service type information of a specific service provided in the small cell 7, as table information.

The table information is stored in the storage unit 32 of the wireless base station 3 by one of the following methods (1) and (2), or by combination of the following methods (1) and (2).

(1) The table information is created to have appropriate contents by manpower, and is stored in the storage unit 32 of the wireless base station 3.

(2) The wireless base station 4 transmits, to the wireless base station 3, combination of service type information representing the service type of a specific service supported by the small cell 7 managed by the wireless base station 4, and small cell information representing the small cell managed by the wireless base station 4 at a predetermined timing (when the wireless base station 4 is installed, or when an input instruction is received from the manager of the wireless base station 4) by a message on the interface between the wireless base station 3 and the wireless base station 4 (e.g. in the case of LTE, X2 Interface). The wireless base station 3 associates the service type information and the small cell information received from the wireless base station 4 with each other, and stores and updates the associated information in the storage unit 32 as the table information.

The communication unit 33 transmits various data output from the control unit 31 to the mobile terminal 2, the wireless base station 4, the core network node 5, and the like. Further, the communication unit 33 receives various data transmitted from the mobile terminal 2, the wireless base station 4, the core network node 5, and the like, and outputs the received data to the control unit 31. In other words, specifically, the communication unit 33 is a communication device which transmits and receives data between the inside of the wireless base station 3 and on side of the mobile communication network of the outside of the wireless base station 3, while converting the data into the format processable individually.

Figure 3:
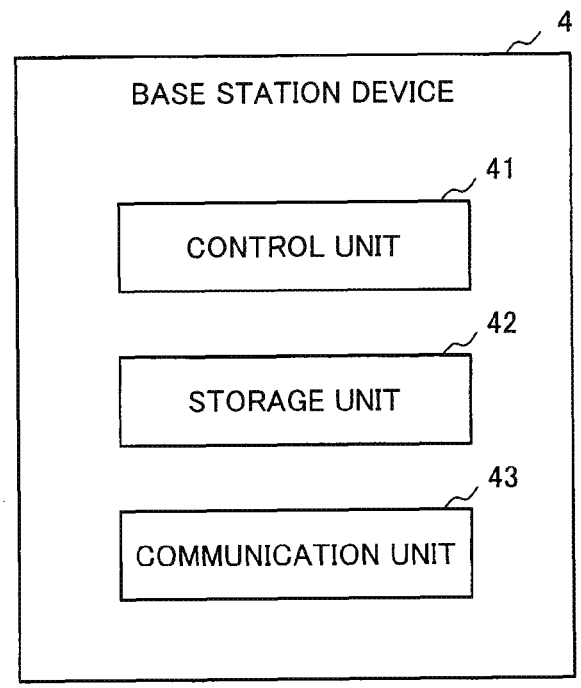
FIG. 3 is a block diagram illustrating a configuration of a wireless base station which manages a small cell in the first exemplary embodiment of the invention.

Next, a configuration of the wireless base station 4 in the first exemplary embodiment of the invention will be described referring to FIG. 3. FIG. 3 is a block diagram illustrating a configuration of the wireless base station 4 in the first exemplary embodiment of the invention.

The wireless base station 4 includes a control unit 41, a storage unit 42, and a communication unit 43.

The control unit 41 integrally controls the wireless base station 4. Specifically, the control unit 41 is implemented by causing the CPU in the control unit 41 to execute a program which causes the CPU to execute a process of integrally controlling the wireless base station 4.

The storage unit 42 is stored with various data to be used by the control unit 41, and a program, and the like to be executed by the control unit 41. The storage unit 42 is constituted of one or more arbitrary storage devices capable of storing the data, a program, and the like.

The communication unit 43 transmits various data output from the control unit 41 to the mobile terminal 2, the wireless base station 3, the core network node 5, and the like. Further, the communication unit 43 receives various data transmitted from the mobile terminal 2, the wireless base station 3, and the core network node 5, and outputs the received data to the control unit 41. In other words, specifically, the communication unit 43 is a communication device which transmits and receives data between the inside of the wireless base station 4 and on side of the mobile communication network of the outside of the wireless base station 4, while converting the data into the format processable individually.

Figure 4:
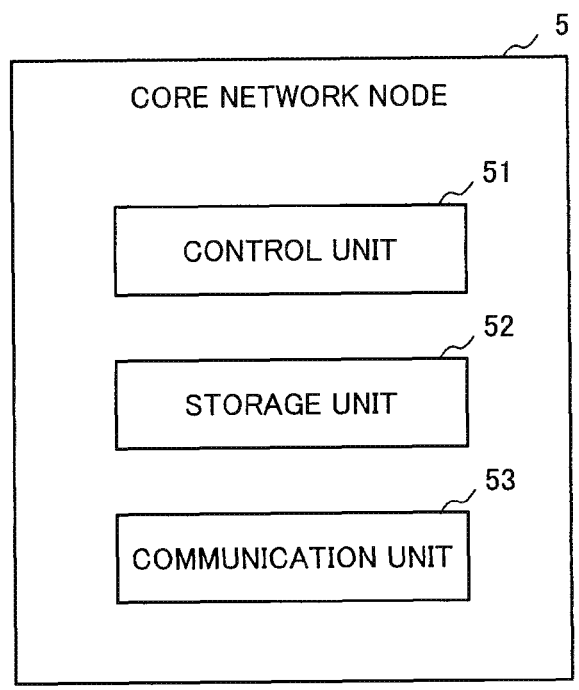
FIG. 4 is a block diagram illustrating a configuration of a core network node in the first exemplary embodiment of the invention.

Next, a configuration of the core network node 5 in the first exemplary embodiment of the invention will be described referring to FIG. 4. FIG. 4 is a block diagram illustrating a configuration of the core network node 5 in the first exemplary embodiment of the invention.

The core network node 5 includes a control unit 51, a storage unit 52, and a communication unit 53.

The control unit 51 integrally controls the core network node 5. Specifically, the control unit 51 is implemented by causing the CPU in the control unit 51 to execute a program which causes the CPU to execute a process of integrally controlling the core network node 5.

The storage unit 52 is stored with various data to be used by the control unit 51, and a program, and the like to be executed by the control unit 41. The storage unit 52 is constituted of one or more arbitrary storage devices capable of storing the data and the program, and the like.

The communication unit 53 transmits various data output from the control unit 51 to the mobile terminal 2, the wireless base stations 3 and 4, and the like. Further, the communication unit 53 receives various data transmitted from the mobile terminal 2, the wireless base stations 3 and 4, and the like and outputs the received data to the control unit 51. In other words, specifically, the communication unit 53 is a communication device which transmits and receives data between the inside of the core network node 5 and on side of the mobile communication network of the outside of the core network node 5, while converting the data into the format processable individually within the core network node 5, and on the side of the mobile communication network side on the outside of the core network node 5.

Figure 5:
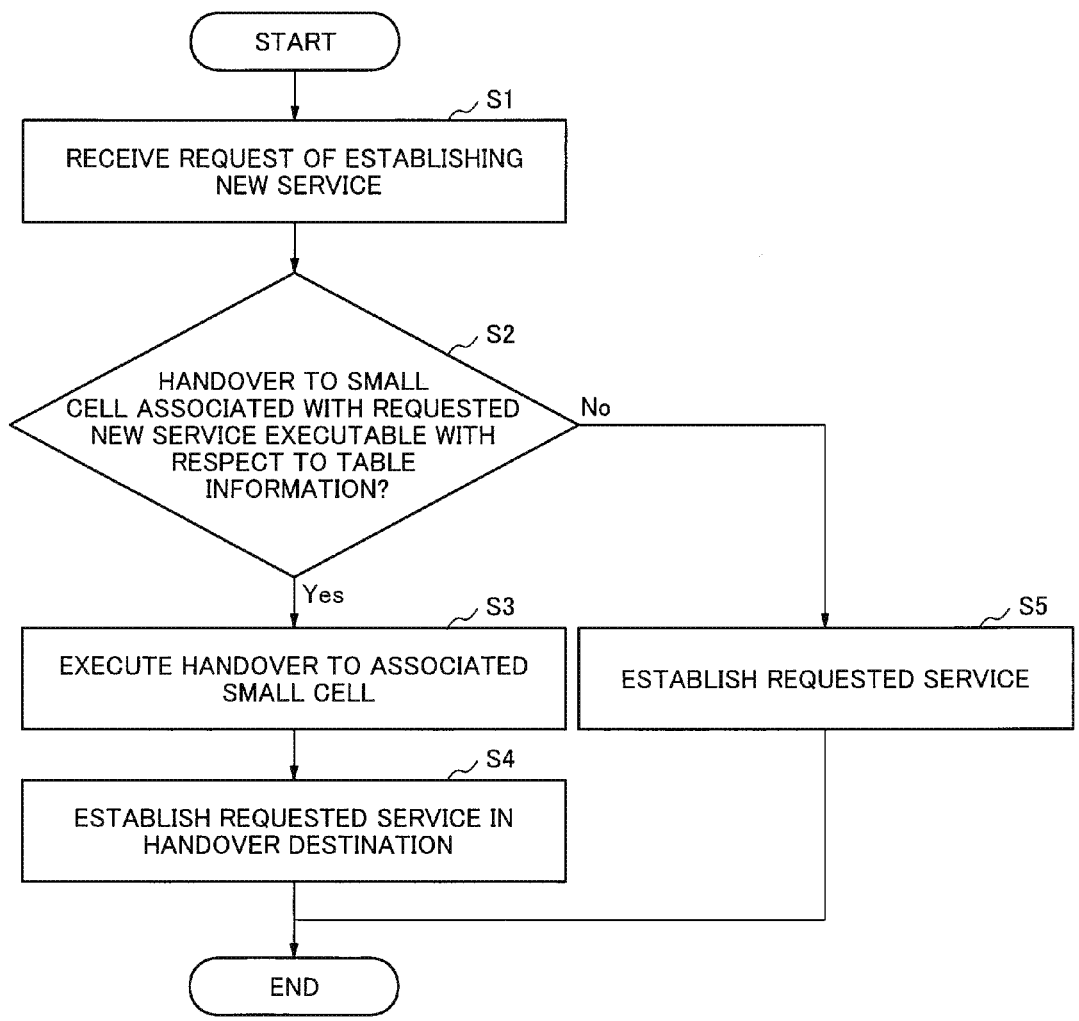
FIG. 5 is a flowchart illustrating a process to be executed by the mobile communication system in the first exemplary embodiment of the invention.

Next, a process to be executed by the mobile communication system 1 in the first exemplary embodiment of the invention will be described. FIG. 5 is a flowchart illustrating a process to be executed by the mobile communication system 1 in the first exemplary embodiment of the invention.

In the following, it is assumed first that the mobile terminal 2 stays in the macro cell 6, and the establishment destination of a bearer in a service is the wireless base station 3 in a state that handover to the small cell 7 is executable.

When establishing a bearer in a service, the mobile terminal 2 transmits service establishment request information requesting establishment of the service to the core network node 5 via the wireless base station 3. The control unit 51 in the core network node 5 receives the service establishment request information transmitted from the mobile terminal 2 via the communication unit 53. The control unit 51 transmits, to the wireless base station 3 via the communication unit 53, service establishment request information requesting establishment of the service requested by the service establishment request information in response to receiving the service establishment request information from the mobile terminal 2. The control unit 31 in the wireless base station 3 receives the service establishment request information transmitted from the core network node 5 via the communication unit 33 (S1).

The control unit 31 in the wireless base station 3 determines whether handover of the mobile terminal 2 to the small cell 7 represented in association with the service requested by the received service establishment request information is executable, referring to the table information stored in the storage unit 32 (S2). Specifically, the control unit 31 determines whether there is service type information representing a service requested by service establishment request information, and whether handover of the mobile terminal 2 to the small cell 7 represented by the small cell information associated with the service type information is executable, referring to the table information stored in the storage unit 32. In other words, when there is service type information representing a requested service in the table information stored in the storage unit 32, it is determined that the service requested from the mobile terminal 2 is a specific service. Further, when handover of the mobile terminal 2 to the small cell 7 represented by the small cell information associated with the service type information is executable, it is determined that the specific service is establishable in the small cell 7 by handover of the mobile terminal 2 to the small cell 7 to which the requested specific service is provided.

It may be determined whether handover of the mobile terminal 2 to the small cell 7 is executable, for example, by judging whether a radio wave having a predetermined intensity or larger propagates from the mobile terminal 2 to the wireless base station 3. This makes it possible to determine whether the service whose establishment is requested from the mobile terminal 2 is a specific service establishable at the present position of the mobile terminal 2.

When determining that handover of the mobile terminal 2 to the small cell 7 associated with a requested service is executable (Yes in S2), the control unit 31 transmits, to the core network node 5 via the communication unit 33, service establishment reply information notifying that establishment of a service has failed in order to execute a handover control to the small cell 7.

When a plurality of small cell information items are associated with the service type information representing a requested service in the table information stored in the storage unit 32, a small cell 7 as the handover destination is selected from among the small cells 7 represented by these small cell information items by the following method.

First of all, small cells 7 whose wireless quality is not lower than a predetermined quality are selected from among the small cells 7. In other words, small cells 7 whose wireless quality is better than the predetermined quality are selected. Subsequently, a small cell 7 as the final handover destination is selected from among the selected small cells by one of the following methods (1) to (3) or by combination of two or more of the following methods (1) to (3).

(1) The priorities are set in advance for the respective small cells 7, and a small cell 7 whose priority is highest is selected.

(2) The load status of each of small cells 7 is checked, and a small cell 7 whose load is smallest is selected.

(3) A small cell 7 is selected at random.

When the method (1) is performed, information representing the priorities of the respective small cells 7 is stored in advance in the storage unit 32, so that the control unit 31 can determine a small cell 7 whose priority is highest by referring to the information. Further, when the method (2) is performed, the control unit 31 in the wireless base station 3 receives information notifying the load status of the respective small cells 7 from the wireless base station 4 which manages the respective small cells 7, and stores the information representing the load status of the respective small cells 7 in the storage unit 32, based on the received information. According to this method, the control unit 31 can determine a small cell 7 whose load is the smallest, by referring to the information representing the load statuses stored in the storage unit 32. Notification of the load status of the small cells 7 may be implemented, for instance, with use of Resource Status Reporting procedure, which is defined by 3GPP (TS36.423, etc.). Further, allowing the mobile terminal 2 staying in each of the small cells 7 to measure the wireless quality of each of the small cells 7, and notifying the respective wireless quality to the wireless base station 3 such that the control unit 31 can specify the wireless quality of each of the small cells 7. Any general method may be used as a method for measuring the wireless quality in each of the mobile terminals 2.

Further, when combination of the method (1) and the method (2) is performed, for instance, an evaluation value such that the evaluation value is enhanced as the priority is increased, and is degraded, as the load status is lowered, may be calculated with respect to each of the small cells 7, and a small cell 7 having a highest calculated evaluation value may be selected.

The control unit 31 in the wireless base station 3 executes a handover control of handing over the mobile terminal 2 from the macro cell 6 to the small cell 7 as the handover destination. Specifically, the wireless base station 3 transmits information requesting handover to the mobile terminal 2. In response to receiving the information, the mobile terminal 2 executes a handover to the small cell 7 and notifies the wireless base station 4 that the handover was successful, and the wireless base station 4 executes to notify the core network node 5 of handover completion (including the handover destination cell information), and the like.

Further, the control unit 51 in the core network node 5 receives service establishment reply information transmitted from the wireless base station 3 via the communication unit 53. When the control unit 51 receives service establishment reply information notifying that establishment of a service has failed, the control unit 51 transmits service establishment request information to the wireless base station 4 which manages the small cell 7 as the handover destination of the mobile terminal 2 via the communication unit 53, after the handover is finished.

The control unit 41 in the wireless base station 4 receives service establishment request information transmitted from the core network node 5 via the communication unit 43. The control unit 41 executes a process of establishing a specific service requested by service establishment request information in response to receiving the service establishment request information (S4). In other words, the control unit 41 establishes a bearer associated with a specific service requested by service establishment request information with respect to the mobile terminal 2 in the small cell 7 to be managed by the wireless base station 4.

On the other hand, when it is determined that handover of the mobile terminal 2 to the small cell 7 associated with a requested service is not executable (No in S2), the control unit 31 executes a process of establishing a service requested by service establishment request information from the core network node 5 (S5). In other words, the control unit 31 establishes a bearer associated with a service requested by service establishment request information with respect to the mobile terminal 2 in the macro cell 6 managed by the wireless base station 3.

Figure 6:
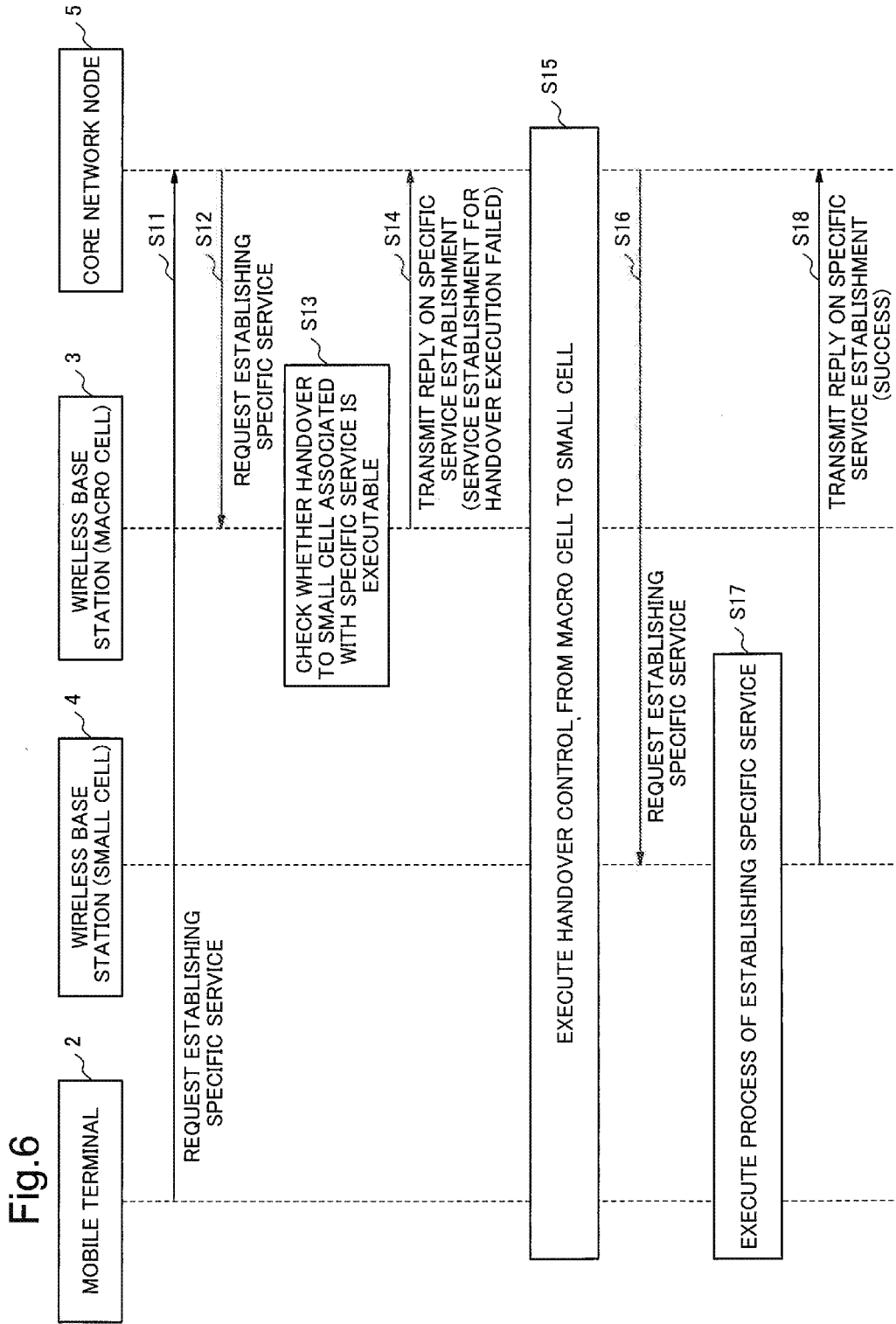
FIG. 6 is a sequence diagram illustrating an operation to be performed by the mobile communication system in the first exemplary embodiment of the invention (when the service is a specific service)

Next, an operation performed by the mobile communication system 1 in the first exemplary embodiment of the invention is described referring to FIG. 6 (when the service is a specific service). FIG. 6 is a sequence diagram illustrating an operation to be performed by the mobile communication system 1 in the first exemplary embodiment of the invention (when the service is a specific service). FIG. 6 exemplifies a case, in which a service whose establishment is requested from the mobile terminal 2 is a specific service.

When a bearer in a specific service is established, the mobile terminal 2 transmits service establishment request information requesting establishment of a specific service to the core network node 5 via the wireless base station 3 (S11). The control unit 51 in the core network node 5 transmits, to the wireless base station 3, service establishment request information requesting establishment of the specific service requested by the service establishment request information in response to receiving the service establishment request information from the mobile terminal 2 (S12).

The control unit 31 in the wireless base station 3 determines whether the service requested by the service establishment request information is a specific service, and whether handover of the mobile terminal 2 to the small cell 7 associated with the specific service is executable in response to receiving the service establishment request information from the core network node 5 (S13). In this example, the service whose establishment is requested from the mobile terminal 2 is a specific service, and handover of the mobile terminal 2 to the small cell 7 associated with the specific service is executable. Therefore, the control unit 31 transmits, to the network node 5, service establishment reply information notifying that establishment of a service has failed (S14).

The control unit 31 in the wireless base station 3 executes a handover control of handing over the mobile terminal 2 from the macro cell 6 to the small cell 7 as the handover destination in response to receiving the service establishment reply information from the core network node 5 (S15). The control unit 51 in the core network node 5 transmits, to the wireless base station 4 which manages the small cell 7 as the handover destination, service establishment request information requesting establishment of the specific service requested by the service establishment request information from the mobile terminal 2, after the handover is finished (S16).

The control unit 41 in the wireless base station 4 executes a process of establishing the specific service requested by the service establishment request information in response to receiving the service establishment request information from the core network node 5 (S17). The control unit 41 in the wireless base station 4 transmits, to the core network node 5, service establishment reply information notifying that establishment of a service was successful, after the specific service establishing process is finished (S18).

Figure 7:
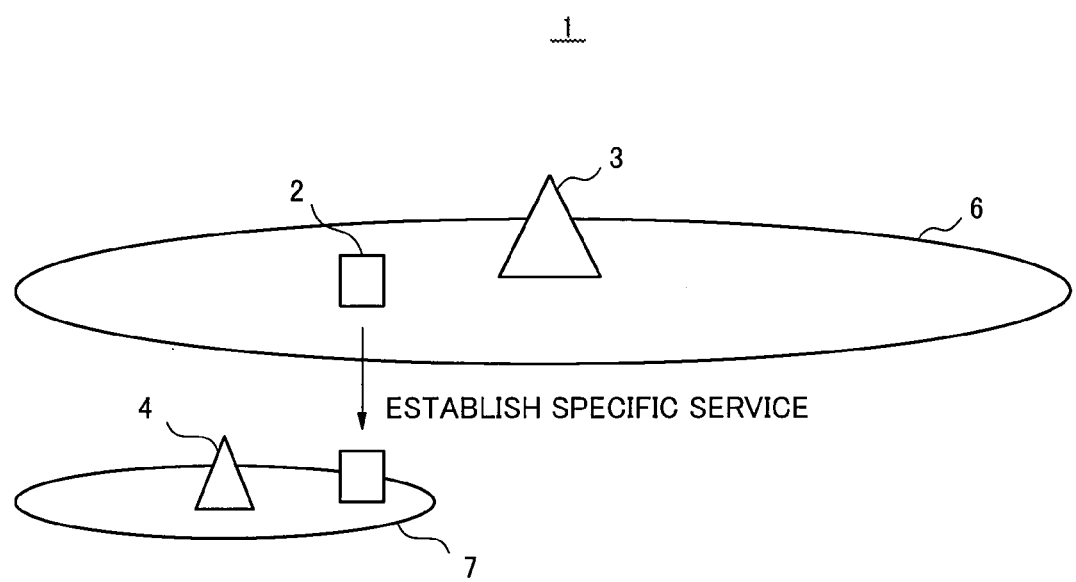
FIG. 7 is a conceptual diagram when an operation of the mobile communication system in the first exemplary embodiment of the invention is performed (when the service is a specific service)

As illustrated in FIG. 7, performing the above control makes it possible to establish a bearer associated with a specific service in the small cell 7 between the mobile terminal 2 and the wireless base station 4. This makes it possible for the mobile terminal 2 to transmit and receive data to and from the other terminal via the established bearer.

Figure 8:
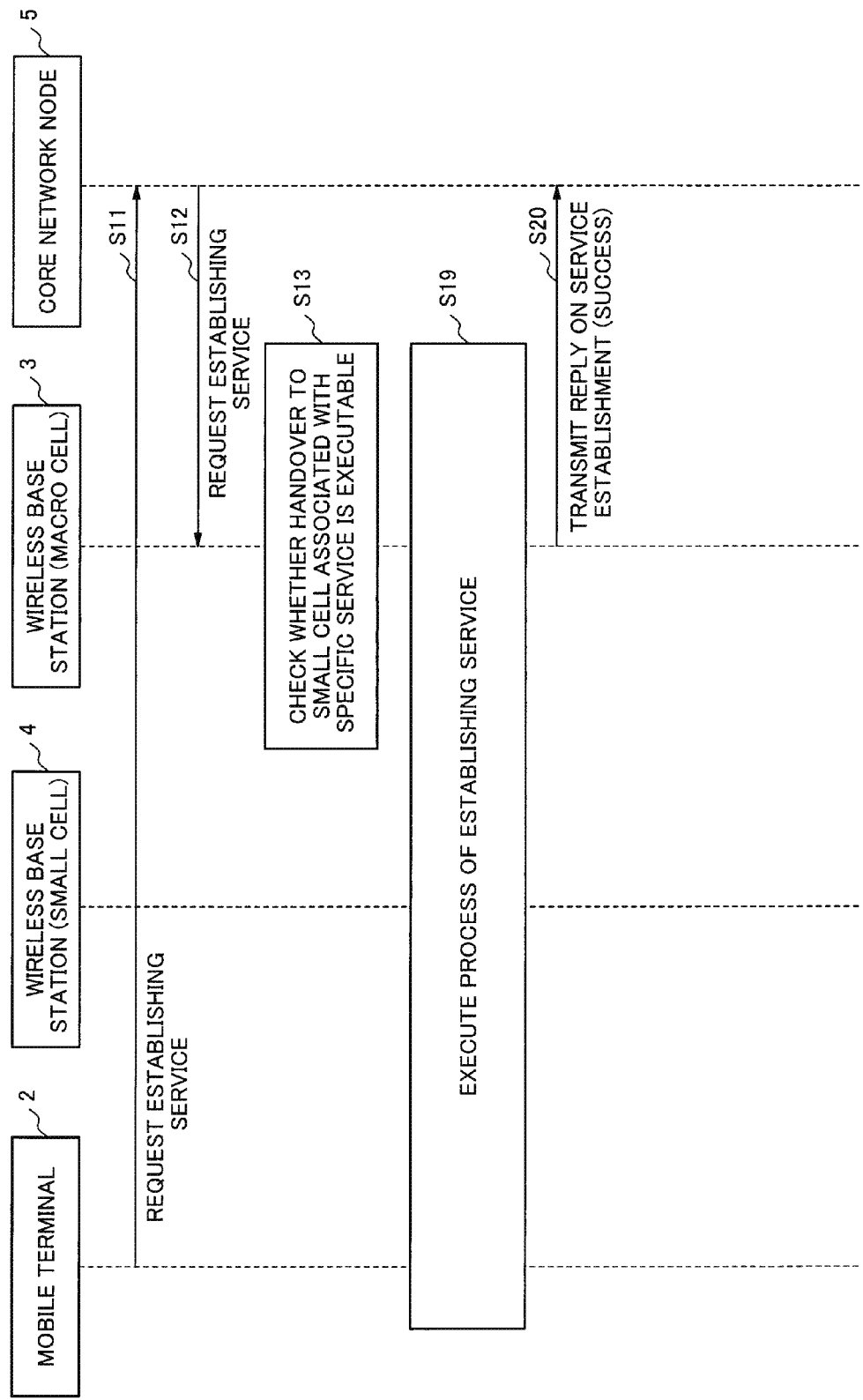
FIG. 8 is a sequence diagram illustrating an operation to be performed by the mobile communication system in the first exemplary embodiment of the invention (when the service is not a specific service)

Next, an operation performed by the mobile communication system 1 (when the service is not a specific service) in the first exemplary embodiment of the invention will be described referring to FIG. 8. FIG. 8 is a sequence diagram illustrating an operation performed by the mobile communication system 1 (when the service is not a specific service) in the first exemplary embodiment of the invention. FIG. 8 exemplifies a case, in which the service whose establishment is requested from the mobile terminal 2 is not a specific service. The same operations as those in FIG. 6 are indicated with the same reference signs, and therefore, description thereof will be omitted.

In the case illustrated in FIG. 8, the service whose establishment is requested from the mobile terminal 2 is not a specific service. Therefore, the control unit 31 in the wireless base station 3 executes a process of establishing a service requested by service establishment request information from the core network node 5 (S19). The control unit 31 transmits, to the core network node 5, service establishment reply information notifying that establishment of a service was successful, after the service establishing process is finished (S20).

Performing the above control makes it possible to establish a bearer associated with a service in the macro cell 6 between the mobile terminal 2 and the wireless base station 4. This makes it possible for the mobile terminal 2 to transmit and receive data to and from the other terminal via the established bearer.

As described above, in the present exemplary embodiment, the mobile terminal 2 which establishes a specific service is handed over from the macro cell 6 to the small cell 7 associated with the specific service. According to this configuration, it is possible to prevent influence on the mobile terminal 2 by retracting, to the small cell 7, the mobile terminal 2 that has established a specific service (the specific service described in the aforementioned service (1)), which occupies a broad band and may affect the other mobile terminal 2 staying in the macro cell 6.

Further, it is possible to implement a special service provided only in the specific small cell 7 (e.g. a service such that direct communication is enabled only in the case where a plurality of mobile terminals 2 stay in one small cell 7, a service such that provided data is receivable by accessing only in the case where the mobile terminal 2 stays in the specific small cell 7, or the like) (the specific service described in the aforementioned service (2)).

When the requested service is the aforementioned service (the specific service described in the aforementioned service (2)), and if service type information representing a requested service is present in the table information (in other words, the requested service is a specific service), and determined that handover of the mobile terminal 2 to the small cell 7 associated with the specific service is not executable, the control unit 31 in the wireless base station 3 may inhibit establishment of a service, without establishing a service in the macro cell 6.

Second Exemplary Embodiment of Invention

In the first exemplary embodiment, it is determined whether execution of handover to the small cell 7 associated with a specific service is necessary in the wireless base station 3. In the second exemplary embodiment, description will be given on a case which the determination is performed in a core network node 5. For instance, the second exemplary embodiment is advantageous in the case where it is not possible to determine whether a service requested from a mobile terminal 2 is a "specific service" requiring handover to a small cell 7 solely from the information transmittable from the core network node 5 to a wireless base station 3, in a mobile communication method applied to a mobile communication system 1.

The configuration of the mobile communication system 1 and of the components 3 to 5 is the same as that in the first exemplary embodiment, and therefore, description thereof will be omitted. In the second exemplary embodiment, the table information stored in the storage unit 32 of the wireless base station 3 in the first exemplary embodiment is stored in a storage unit 52 in the core network node 5. In the second exemplary embodiment, table information items of the respective wireless base stations 3 as lower nodes of the core network node 5 are stored.

The table information is stored in the storage unit 52 of the core network node 5 by one of the following methods (1) and (2), or by combination of the following methods (1) and (2).

(1) The table information is created to have appropriate contents by manpower, and is stored in a storage unit 32 of the wireless base station 3.

(2) The wireless base station 4 transmits, to the core network node 5, combination of service type information representing the service type of a specific service supported by a small cell 7 managed by the wireless base station 4, and small cell information representing the small cell to be managed by the wireless base station 4 at a predetermined timing (when the wireless base station 4 is installed, or when an input instruction is received from the manager of the wireless base station 4) by a message on the interface (e.g. in the case of LTE, S1 Interface) between the core network node 5 and the wireless base station 4. The core network node 5 associates the service type information and the small cell information received from the wireless base station 4 with each other, and stores and updates the associated information in a storage unit 51 as the table information.

Figure 9:
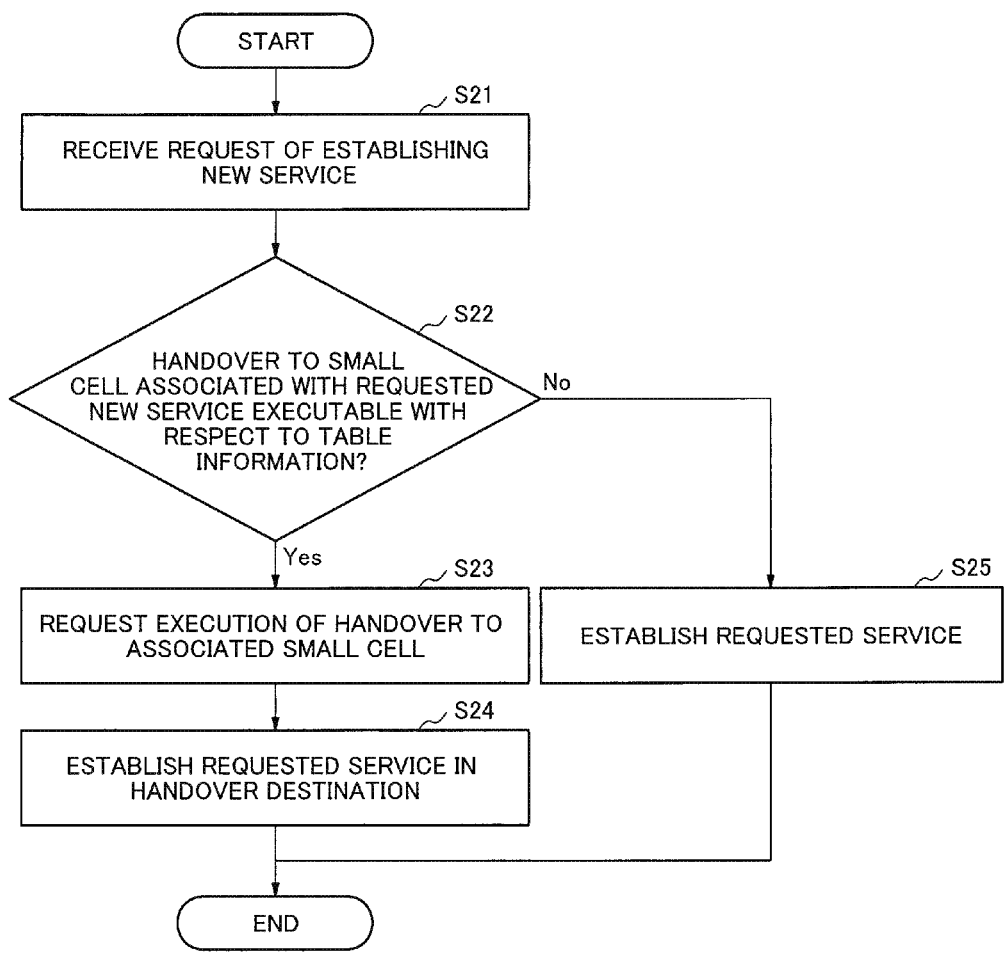
FIG. 9 is a flowchart illustrating a process relating to a core network node in a second exemplary embodiment of the invention.

Next, a process relating to the core network node 5 in the second exemplary embodiment of the invention will be described referring to FIG. 9. FIG. 9 is a flowchart illustrating the process relating to the core network node 5 in the second exemplary embodiment of the invention.

In the following, it is assumed that the mobile terminal 2 stays in a macro cell 6, and the establishment destination of a bearer in a service is the wireless base station 3 in a state that handover to the small cell 7 is executable.

When establishing a bearer in a service, the mobile terminal 2 transmits service establishment request information requesting establishment of the service to the core network node 5 via the wireless base station 3. A control unit 51 in the core network node 5 receives the service establishment request information transmitted from the mobile terminal 2 via a communication unit 53 (S21).

The control unit 51 determines whether handover of the mobile terminal 2 to the small cell 7 represented in association with the service requested by the received service establishment request information is executable, referring to the table information stored in the storage unit 52 (S22). Specifically, the control unit 51 determines whether there is service type information representing a service requested by service establishment request information, and whether there is small cell information associated with the service type information in the table information stored in the storage unit 52, and whether handover of the mobile terminal 2 to the small cell 7 represented by the small cell information is executable. The determination uses the table information item associated with the wireless base station 3 which manages the macro cell 6 in which the mobile terminal 2 requesting service establishment stays, out of the table information items stored in the storage unit 52.

Further, as well as the first exemplary embodiment, it may be determined whether handover of the mobile terminal 2 to the small cell 7 is executable by judging whether a radio wave having a predetermined intensity or larger propagates from the mobile terminal 2 to the wireless base station 3. This makes it possible to determine whether the service whose establishment is requested from the mobile terminal 2 is a specific service establishable at the present position of the mobile terminal 2.

When it is determined that handover of the mobile terminal 2 to the small cell 7 associated with a requested service is executable (Yes in S22), the control unit 51 transmits, to the wireless base station 3 via the communication unit 53, handover execution request information requesting execution of handover to the small cell 7 (S23). When a plurality of small cell information items are associated with service type information representing a requested service, the small cell 7 as the handover destination may be selected in the same manner as in the first exemplary embodiment.

The control unit 51 receives handover execution reply information that has been transmitted from the wireless base station 3 in response to handover execution request information via the communication unit 53. When the control unit 51 receives handover execution reply information notifying that handover is appropriately executable, the control unit 51 transmits service establishment request information to the wireless base station 4 which manages the small cell 7 as the handover destination of the mobile terminal 2 via the communication unit 53, after the handover is finished.

A control unit 41 in the wireless base station 4 receives service establishment request information transmitted from the core network node 5 via a communication unit 43. The control unit 41 executes a process of establishing a specific service requested by the service establishment request information in response to receiving the service establishment request information (S24). In other words, the control unit 41 establishes a bearer associated with a specific service requested by service establishment request information with respect to the mobile terminal 2 in the small cell 7 managed by the wireless base station 4.

On the other hand, when it is determined that handover of the mobile terminal 2 to the small cell 7 associated with a requested service is not executable (No in S22), the control unit 51 transmits, to the wireless base station 3 via the communication unit 53, service establishment request information requesting establishment of a service requested by the service establishment request information from the mobile terminal 2. A control unit 31 in the wireless base station 3 receives the service establishment request information transmitted from the core network node 5 via a communication unit 33. A control unit 31 executes a process of establishing the service requested by the service establishment request information in response to receiving the service establishment request information (S25). In other words, the control unit 31 establishes a bearer associated with a service requested by service establishment request information with respect to the mobile terminal 2 in the macro cell 6 managed by the wireless base station 3.

Figure 10:
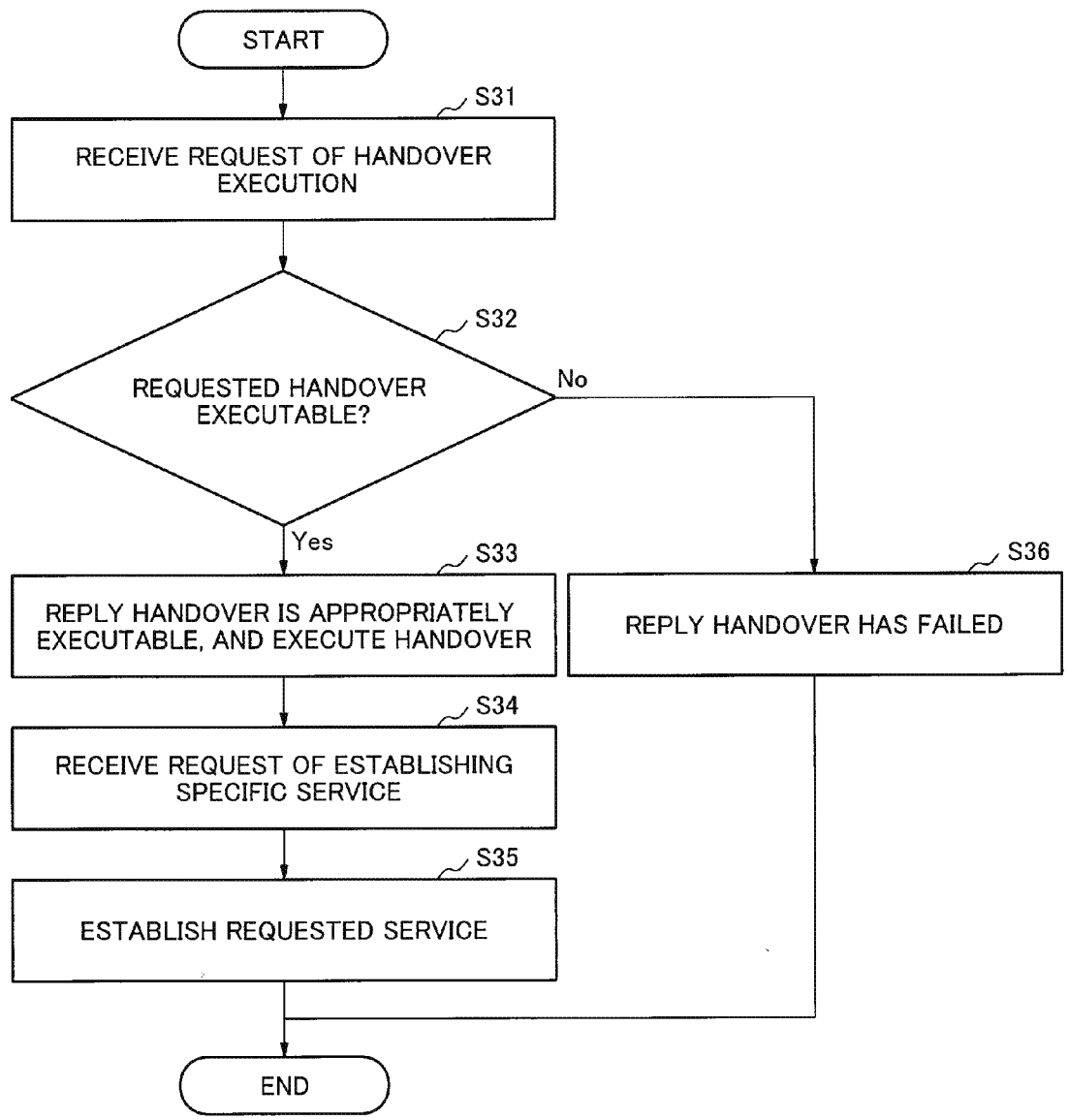
FIG. 10 is a flowchart illustrating a process relating to a wireless base station in the second exemplary embodiment of the invention.

Next, a process relating to the wireless base stations 3 and 4 in the second exemplary embodiment of the invention will be described referring to FIG. 10. FIG. 10 is a flowchart illustrating the process relating to the wireless base stations 3 and 4 in the second exemplary embodiment of the invention.

The control unit 31 in the wireless base station 3 receives handover execution request information requesting execution of handover to the small cell 7, which has been transmitted from the core network node 5, via the communication unit 33 (S31).

The control unit 31 determines whether handover to the small cell 7 as the handover destination requested by the handover execution request information is executable in response to receiving the handover execution request information (S32). In this example, it is possible to determine whether handover is executable by judging whether the wireless quality of the small cell 7 as the handover destination is not lower than a predetermined quality. As described in the first exemplary embodiment, allowing the mobile terminal 2 staying in each of the small cells 7 to measure the wireless quality of each of the small cells 7, and notifying the respective wireless quality to the wireless base station 3 such that the control unit 31 can specify the wireless quality of each of the small cells 7.

Further alternatively, allowing the core network node 5 to include information that uniquely specifies the small cell 7 as the handover destination in the handover execution request information makes it possible for the control unit 31 to specify the small cell 7 as the handover destination by referring to the information. Further alternatively, allowing the core network node 5 to include information that represents all the small cells 7 associated with a specific service in the handover execution request information such that the control unit 31 can determine the small cell 7 as the handover destination, based on the respective wireless quality of the small cells 7. For instance, it is possible to select a small cell 7 whose wireless quality is best.

When it is determined that handover to the small cell 7 as the handover destination is executable (Yes in S32), the control unit 31 transmits, to the core network node 5 via the communication unit 33, handover execution reply information notifying that handover will be appropriately executed, and executes a handover control of handing over the mobile terminal 2 from the macro cell 6 to the small cell 7 as the handover destination (S33).

The control unit 41 in the wireless base station 4 receives the service establishment request information that has been transmitted from the core network node 5 in response to the handover execution reply information via the communication unit 43 (S34). The control unit 41 executes a process of establishing a specific service requested by the service establishment request information in response to receiving the service establishment request information (S35). In other words, the control unit 41 establishes a bearer associated with a specific service requested by service establishment request information with respect to the mobile terminal 2 in the small cell 7 to be managed by the wireless base station 4.

On the other hand, when it is determined that handover to the small cell 7 as the handover destination is not executable (No in S32), the control unit 31 transmits handover execution reply information notifying that the handover has failed to the core network node 5 via the communication unit 33. In this case, the control unit 51 in the core network node 5 may transmit service establishment request information to the wireless base station 3 in response to receiving the handover execution reply information from the wireless base station 3, and may, in macro cell 6, establish a service between the wireless base station 3 and the mobile terminal 2, or may inhibit establishment of a service.

Figure 11:
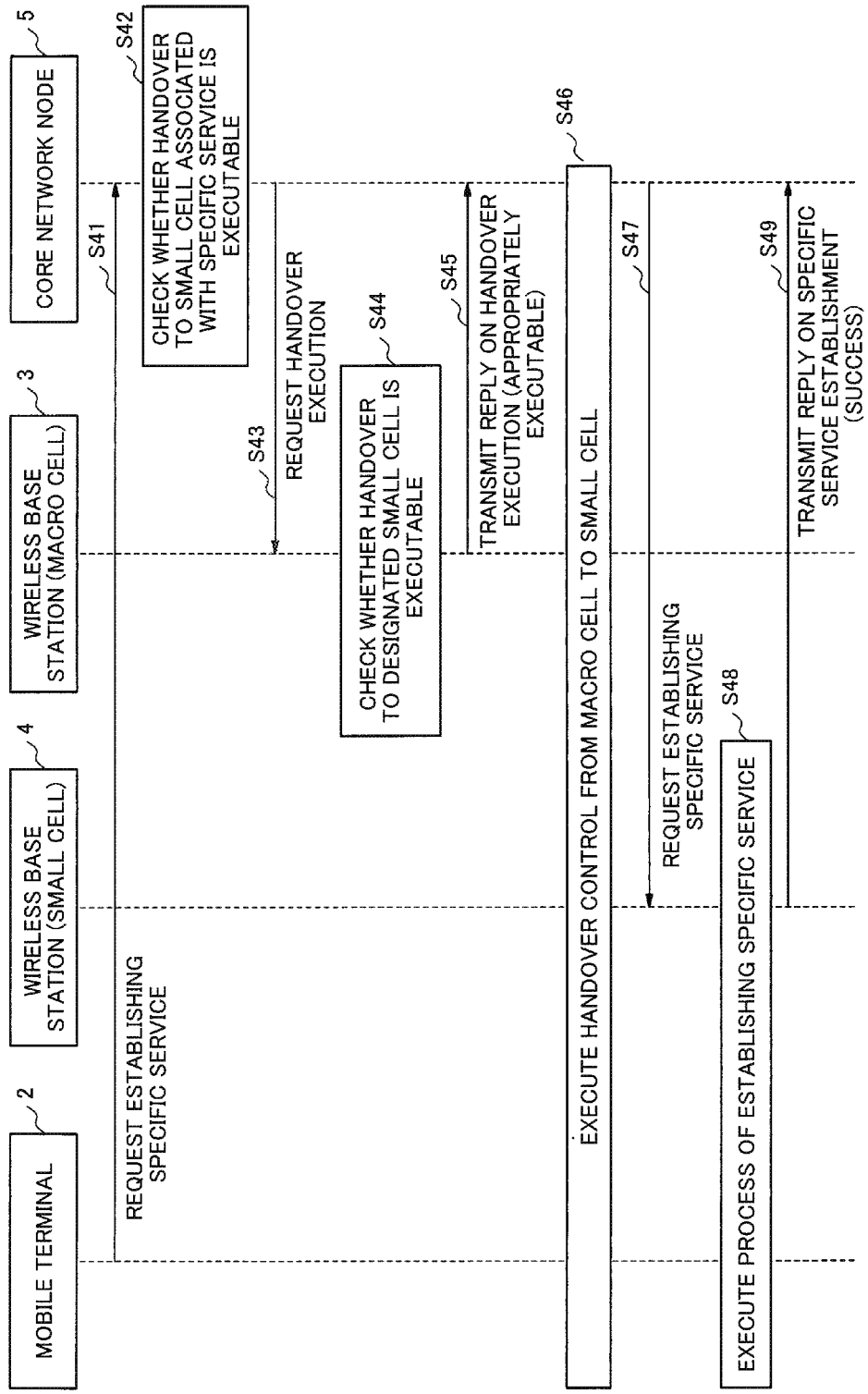
FIG. 11 is a sequence diagram illustrating an operation to be performed by a mobile communication system in the second exemplary embodiment of the invention (when the service is a specific service)

Next, an operation performed by the mobile communication system 1 (when the service is a specific service) in the second exemplary embodiment of the invention will be described referring to FIG. 11. FIG. 11 is a sequence diagram illustrating an operation performed by the mobile communication system 1 (when the service is a specific service) in the second exemplary embodiment of the invention. FIG. 11 exemplifies a case, in which the service whose establishment is requested from the mobile terminal 2 is a specific service.

When a bearer in a specific service is established, the mobile terminal 2 transmits service establishment request information requesting establishment of a specific service to the core network node 5 via the wireless base station 3 (S41). The control unit 51 in the core network node 5 determines whether the service requested by the service establishment request information is a specific service, and whether handover of the mobile terminal 2 to the small cell 7 associated with the specific service is executable in response to receiving the service establishment request information from the mobile terminal 2 (S42). In this example, the service whose establishment is requested from the mobile terminal 2 is a specific service, and handover of the mobile terminal 2 to the small cell 7 associated with the specific service is executable. Therefore, the control unit 51 transmits handover execution request information to the wireless base station 3 (S43).

The control unit 31 in the wireless base station 3 determines whether handover to the small cell 7 designated by the handover execution request information is executable in response to receiving the handover execution request information from the core network node 5 (S44). In this example, it is assumed that handover to the designated small cell 7 is executable. In this case, the control unit 31 transmits, to the core network node 5, handover execution reply information notifying that handover will be appropriately executed (S45).

Further, the control unit 31 executes a handover control of handing over the mobile terminal 2 from the macro cell 6 to the small cell 7, which is designated as the handover destination (S46). The control unit 51 in the core network node 5 transmits, to the wireless base station 4 which manages the small cell 7 as the handover destination, service establishment request information requested by the service establishment request information from the mobile terminal 2, after the handover is finished (S47).

The control unit 41 in the wireless base station 4 executes a process of establishing a specific service requested by the service establishment request information in response to receiving the service establishment request information from the core network node 5 (S48). The control unit 41 in the wireless base station 4 transmits, to the core network node 5, service establishment reply information notifying that establishment of a service was successful, after the specific service establishing process is finished (S49).

As illustrated in FIG. 7, performing the above control makes it possible to establish a bearer associated with a specific service in the small cell 7 between the mobile terminal 2 and the wireless base station 4. This makes it possible for the mobile terminal 2 to transmit and receive data to and from the other terminal via the established bearer.

Figure 12:
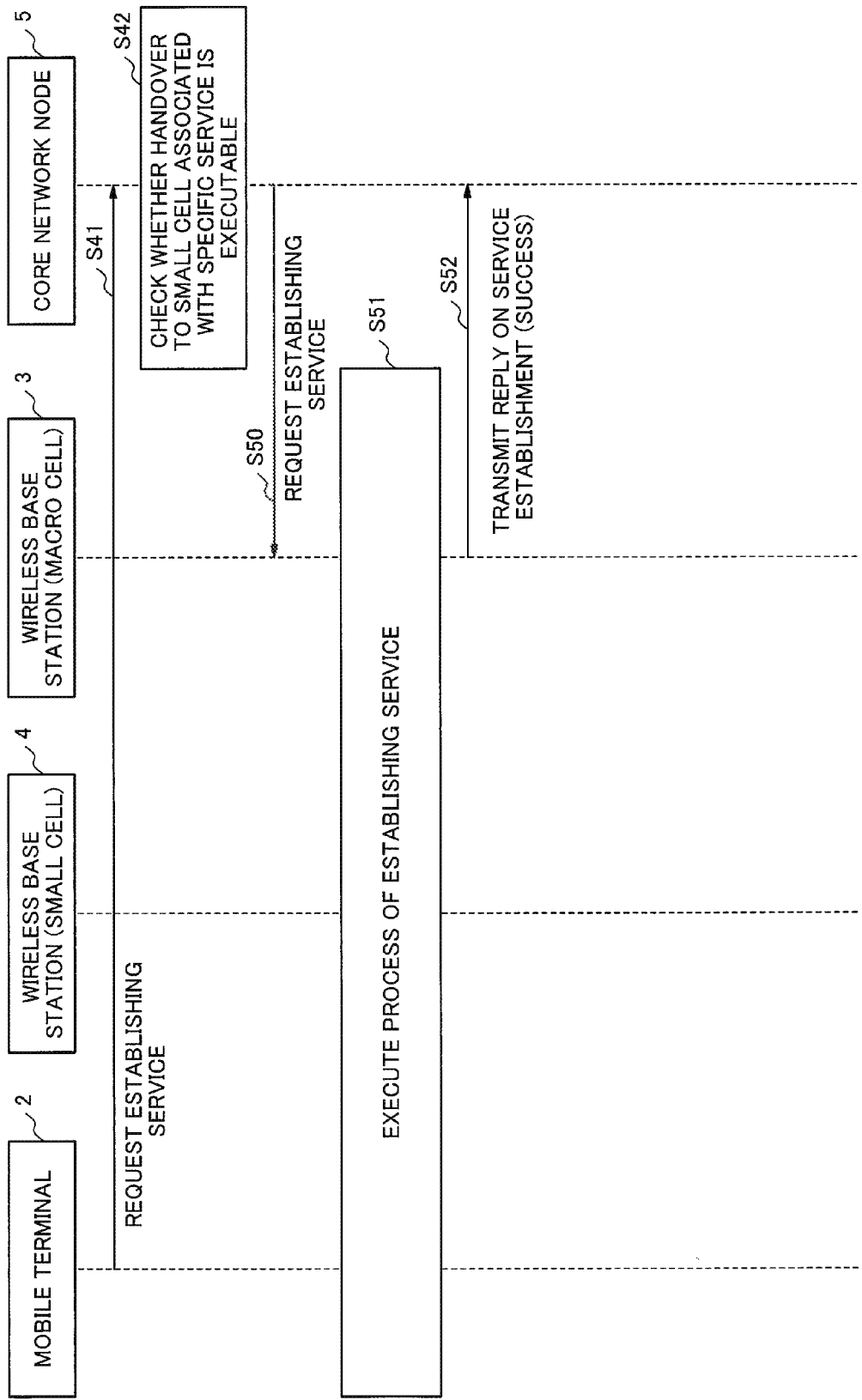
FIG. 12 is a sequence diagram illustrating an operation to be performed by the mobile communication system in the second exemplary embodiment of the invention (when the service is not a specific service)

Next, an operation to be performed by the mobile communication system 1 (when the service is not a specific service) in the second exemplary embodiment of the invention will be described referring to FIG. 12. FIG. 12 is a sequence diagram illustrating an operation to be performed by the mobile communication system 1 (when the service is not a specific service) in the second exemplary embodiment of the invention. FIG. 12 exemplifies a case, in which the service whose establishment is requested from the mobile terminal 2 is not a specific service. The same operations as those in FIG. 11 are indicated with the same reference signs, and therefore, description thereof will be omitted.

In the configuration illustrated in FIG. 12, the service whose establishment is requested from the mobile terminal 2 is not a specific service. Therefore, the control unit 51 in the core network node 5 transmits, to the wireless base station 3, service establishment request information requesting establishment of a service requested by the service establishment request information from the mobile terminal 2 (S50). The control unit 31 in the wireless base station 3 executes a process of establishing the service requested by the service establishment request information in response to receiving the service establishment request information from the core network node 5 (S51). The control unit 31 transmits, to the core network node 5, service establishment reply information notifying that establishment of a service was successful, after the service establishing process is finished (S52).

Performing the above control makes it possible to establish a bearer associated with a service in the macro cell 6 between the mobile terminal 2 and the wireless base station 4. This makes it possible for the mobile terminal 2 to transmit and receive data to and from the other terminal via the established bearer.

As described above, in response to a request of establishing a specific service from the mobile terminal 2, it is possible to determine whether establishment of the specific service is executable by handover to the small cell 7 associated with the specific service.

Third Exemplary Embodiment of Invention

In the first and second exemplary embodiments, description has been made based on the premise that handover is executed in one RAT (Radio Access Technology). Alternatively, the handover destination may be a cell in a different RAT. In other words, a so-called inter-RAT handover may be executed. Further, when the inter-RAT handover function is not supported on the side of the mobile terminal 2 or on the side of the core network in the above configuration, redirection of the mobile terminal 2 to the RAT may be executed. The inter-RAT handover and the redirection are the existing technologies, and therefore, description thereof will be omitted.

Summary of Exemplary Embodiments of Invention

Figure 13:
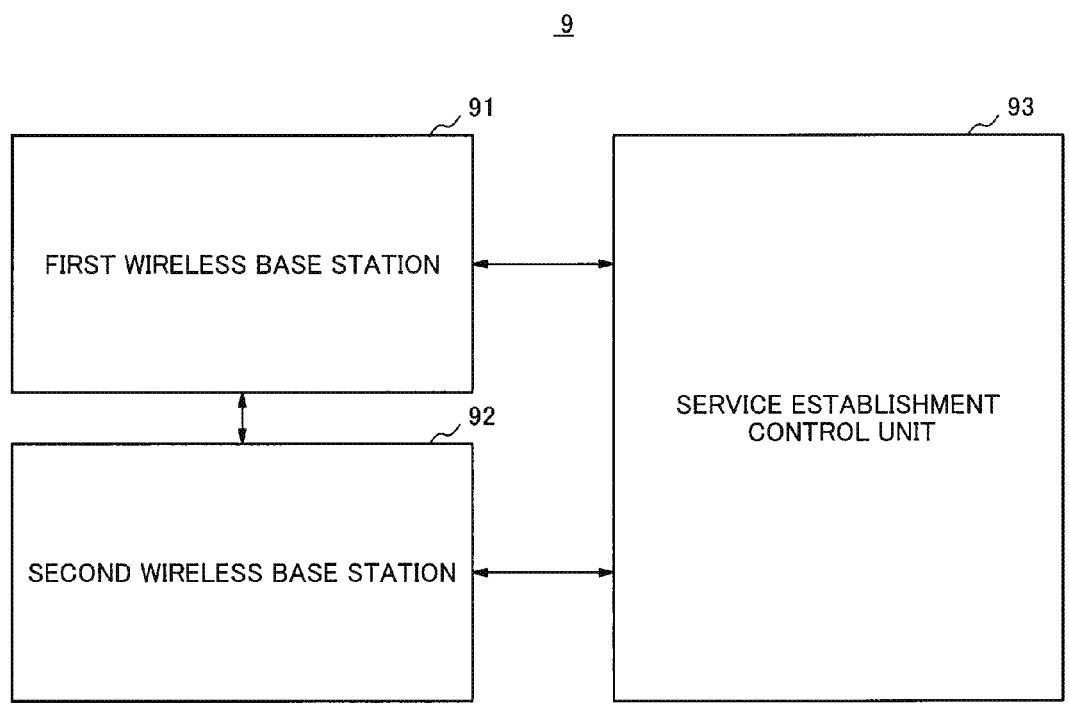
FIG. 13 is a block diagram illustrating a schematic configuration of the mobile communication system in the first exemplary embodiment of the invention.

Next, a schematic configuration of the mobile communication system 1 in the first exemplary embodiment of the invention will be described referring to FIG. 13. FIG. 13 is a block diagram illustrating a mobile communication system 9 serving as a schematic configuration of the mobile communication system 1 in the first exemplary embodiment of the invention.

The mobile communication system 9 includes a first wireless base station 91, a second wireless base station 92, and a service establishment control unit 93.

The first wireless base station 91 manages a macro cell. The first wireless base station 91 corresponds to the wireless base station 3.

The second wireless base station 92 manages a small cell included in the macro cell. The second wireless base station 92 corresponds to the wireless base station 4.

The service establishment control unit 93 executes a service establishment control of establishing a service between a mobile terminal and the first wireless base station 91 in the macro cell in response to a request of establishing a service from the mobile terminal. Further, when the service whose establishment is requested from the mobile terminal is a specific service, the service establishment control unit 93 executes a handover control of the mobile terminal from the first wireless base station 91 to the second wireless base station 92, and then executes a service establishment control of establishing a service between the mobile terminal and the second wireless base station in the small cell. The service establishment control unit 93 corresponds to the control unit 31 in the wireless base station 3 in the first exemplary embodiment, and corresponds to the control unit 51 in the core network node 5 in the second exemplary embodiment.

The invention is not limited to the foregoing exemplary embodiments, and may be modified as far as the modification does not depart from the gist of the invention.

Further, in the forging exemplary embodiments, a macro cell is used as a cell managed by the wireless base station 3, and a small cell is used as a cell managed by the wireless base station 4. The invention is not limited to the above. For instance, the cell managed by the wireless base station 3 may be a micro cell, instead of a macro cell, and the cell managed by the wireless base station 4 may be a pico cell or a femto cell, which is smaller than a micro cell. Any configuration is applicable, as long as the cell to be managed by the wireless base station 4 is smaller than the cell to be managed by the wireless base station 3.

Further, the program to be executed in each of the wireless base stations 3 and 4, and the core network node 5 as described above may be stored with use of a variety of types of non-transitory computer-readable medium, and may be supplied to the wireless base stations 3 and 4, and the core network node 5 (computer). The non-transitory computer-readable medium includes a variety of types of tangible storage medium. Examples of the non-transitory computer-readable medium include a magnetic recording medium (e.g. a flexible disk, a magnetic tape, a hard disk drive), a magneto-optical recording medium (e.g. magneto-optical disks), a CD-ROM (Read Only Memory), a CD-R, a CD-R/W, a semiconductor memory (e.g. a mask ROM, a PROM (Programmable ROM), an EPROM (Erasable PROM), a flash ROM, and a RAM (Random Access Memory)). Further, the program may be supplied to a computer by a variety of types of transitory computer-readable medium. Examples of the transitory computer-readable medium include an electrical signal, an optical signal, and an electromagnetic wave. The transitory computer-readable medium can supply a program to a computer via a wired communication path such as a cable and an optical fiber, or via a wireless communication path.

The whole part or part of the exemplary embodiments disclosed above can be described as, but not limited to, the following supplementary notes.

(Supplementary note 1)

A mobile communication system, including:

a first wireless base station which manages a first cell;

a second wireless base station which manages a second cell included in the first cell; and a service establishment control unit which executes a service establishment control of establishing a service between the mobile terminal and the first wireless base station in the first cell in response to a request of establishing a service from the mobile terminal, wherein the service establishment control unit executes a handover control of the mobile terminal from the first wireless base station to the second wireless base station, and then executes a service establishment control of establishing a service between the mobile terminal and the second wireless base station in the second cell, when the service whose establishment is requested from the mobile terminal is a specific service.

(Supplementary note 2)

The mobile communication system according to Supplementary note 1, further including:

a storage unit which stores specific service information representing the specific service, wherein the service establishment control unit determines whether the service whose establishment is requested from the mobile terminal is the specific service, based on judgment as to whether the specific service information representing the service whose establishment is requested from the mobile terminal is stored in the storage unit.

(Supplementary note 3)

The mobile communication system according to Supplementary note 2, wherein the storage unit further stores cell information associated with the specific service information representing the specific service, and representing the second cell serving as an area for providing the specific service, and the service establishment control unit executes the handover control and then executes the service establishment control, when the specific service information representing the service whose establishment is requested from the mobile terminal is stored in the storage unit, and handover of the mobile terminal to the second cell represented by the cell information associated with the specific service information is executable.

(Supplementary note 4)

The mobile communication system according to Supplementary note 3, wherein the first cell includes a plurality of the second cells, the mobile communication system includes a plurality of the second wireless base stations so that the second wireless base stations respectively manage the second cells, the storage unit stores a plurality of the cell information items so that the cell information items respectively represent the second cells, the specific service information is associated with one or more of the cell information items, and the service establishment control unit decides a second wireless base station as a handover destination in the handover control, out of the second wireless base station managing the second cell whose wireless quality is not lower than a predetermined quality, the second cell being one of the plurality of the second cells represented by the plurality of the cell information items, when there are the plurality of the cell information items associated with the specific service information representing the service whose establishment is requested from the mobile terminal.

(Supplementary note 5)

The mobile communication system according to Supplementary note 4, wherein the service establishment control unit decides, as the second wireless base station serving as the handover destination, a second wireless base station managed by the second cell of a predetermined highest priority, or the second cell of a lowest load status, or the second cell decided at random, out of the second cells whose wireless quality is not lower than the predetermined quality.

(Supplementary note 6)

The mobile communication system according to any one of Supplementary notes 2 to 5, further including:

a core network node including the storage unit and the service establishment control unit, wherein the service establishment control unit transmits, to the first wireless base station, service establishment request information requesting establishment of a service, as the service establishment control, and transmits the service establishment request information to the second wireless base station, as the service establishment control, when the service whose establishment is requested from the mobile terminal is the specific service, the first wireless base station establishes a service with respect to the mobile terminal in the first cell in response to the service establishment request information from the service establishment control unit, and the second wireless base station establishes a service with respect to the mobile terminal in the second cell in response to the service establishment request information from the service establishment control unit.

(Supplementary note 7)

The mobile communication system according to any one of Supplementary notes 2 to 5, wherein the first wireless base station includes the storage unit and the service establishment control unit, the service establishment control unit establishes a service with respect to the mobile terminal in the first cell, as the service establishment control, and transmits, to a core network node, service unestablished notification information for making the core network node transmit service establishment request information requesting establishment of a service with respect to the second wireless base station, as the service establishment control, when the service whose establishment is requested from the mobile terminal is the specific service, and the second wireless base station establishes a service with respect to the mobile terminal in the second cell in response to service establishment request information from the core network node.

(Supplementary note 8)

A wireless station for executing a control of establishing a service between a first wireless base station which manages a first cell or a second wireless base station which manages a second cell included in the first cell, and a mobile terminal, the wireless station including:

a service establishment control unit which executes a service establishment control of establishing a service between the mobile terminal and the first wireless base station in the first cell in response to a request of establishing a service from the mobile terminal, wherein the service establishment control unit executes a handover control of the mobile terminal from the first wireless base station to the second wireless base station, when the service whose establishment is requested from the mobile terminal is a specific service, and then executes a service establishment control of establishing a service between the mobile terminal and the second wireless base station in the second cell.

(Supplementary note 9)

A mobile communication control method for executing a control of establishing a service between a first wireless base station which manages a first cell or a second wireless base station which manages a second cell included in the first cell, and a mobile terminal, the mobile communication control method including:

a step of receiving a request of establishing a service from the mobile terminal; and a step of executing a service establishment control of establishing a service between the mobile terminal and the first wireless base station in the first cell, wherein in the step of executing the service establishment control, when the service whose establishment is requested from the mobile terminal is a specific service, a handover control of the mobile terminal from the first wireless base station to the second wireless base station is executed, and then, a service establishment control of establishing a service between the mobile terminal and the second wireless base station is executed in the second cell.

(Supplementary note 10)

A mobile communication control program for executing a control of establishing a service between a first wireless base station which manages a first cell or a second wireless base station which manages a second cell included in the first cell, and a mobile terminal, the program causing a computer to execute:
a process of receiving a request of establishing a service from the mobile terminal; and
a process of executing a service establishment control of establishing a service between the mobile terminal and the first wireless base station in the first cell, wherein
in the process of executing the service establishment control, when the service whose establishment is requested from the mobile terminal is a specific service, a handover control of the mobile terminal from the first wireless base station to the second wireless base station is executed, and then, a service establishment control of establishing a service between the mobile terminal and the second wireless base station is executed in the second cell.

(Supplementary note 11)
The mobile communication system according to any one of Supplementary notes 1 to 7, wherein
the first cell is a macro cell.

(Supplementary note 12)
The mobile communication system according to any one of Supplementary notes 1 to 7, wherein
the second cell is a small cell.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2012-158616 filed on Jul. 17, 2012, the disclosure of which is incorporated herein in its entirety by reference.

REFERENCE SIGNS LIST 1, 9 Mobile communication system
2 Mobile terminal
3, 4 Wireless base station
5 Core network system
6 Macro cell
7 Small cell
31, 41, 51 Control unit
32, 42, 52 Storage unit
33, 43, 53 Communication unit
91 First wireless base station
92 Second wireless base station
93 Service establishment control unit

The invention claimed is:

1. A mobile communication system, comprising:
a first wireless base station which manages a first cell;
a second wireless base station which manages a second cell included in the first cell; and
a service establishment control unit which executes a service establishment control of establishing a service between the mobile terminal and the first wireless base station in the first cell in response to a request of establishing a service from the mobile terminal,
the service establishment control unit executing a handover control of the mobile terminal from the first wireless base station to the second wireless base station, and then executing a service establishment control of establishing a service between the mobile terminal and the second wireless base station in the second cell, when the service whose establishment is requested from the mobile terminal is a specific service,
the service establishment control unit deciding, as the second wireless base station serving as the handover destination, a second wireless base station to be managed by the second cell of a predetermined highest priority, or the second cell of a lowest load status, or the second cell decided at random, out of second cells whose wireless quality is not lower than a predetermined quality.

2. The mobile communication system according to claim 1, further comprising:
a storage unit which stores specific service information representing the specific service,
wherein the service establishment control unit determines whether the service whose establishment is requested from the mobile terminal is the specific service, based on judgment as to whether the specific service information representing the service whose establishment is requested from the mobile terminal is stored in the storage unit.

3. The mobile communication system according to claim 2, wherein the storage unit further stores cell information associated with the specific service information representing the specific service, and representing the second cell serving as an area for providing the specific service, and
the service establishment control unit executes the handover control and then executes the service establishment control, when the specific service information representing the service whose establishment is requested from the mobile terminal is stored in the storage unit, and handover of the mobile terminal to the second cell represented by the cell information associated with the specific service information is executable.

4. The mobile communication system according to claim 3, wherein the first cell includes a plurality of the second cells,
the mobile communication system comprises a plurality of the second wireless base stations so that the second wireless base stations respectively manage the second cells,
the storage unit stores a plurality of the cell information items so that the cell information items respectively represent the second cells,
the specific service information is associated with one or more of the cell information items, and
the service establishment control unit decides a second wireless base station as a handover destination in the handover control, out of the second wireless base station managing the second cell whose wireless quality is not lower than a predetermined quality, the second cell being one of the plurality of the second cells represented by the plurality of the cell information items, when there are the plurality of the cell information items associated with the specific service information representing the service whose establishment is requested from the mobile terminal.

5. The mobile communication system according to claim 2, further comprising:
a core network node including the storage unit and the service establishment control unit,
wherein the service establishment control unit transmits, to the first wireless base station, service establishment request information requesting establishment of a service, as the service establishment control, and transmits the service establishment request information to the second wireless base station, as the service establishment control, when the service whose establishment is requested from the mobile terminal is the specific service, the first wireless base station establishes a service with respect to the mobile terminal in the first cell in response to the service establishment request information from the service establishment control unit, and the second wireless base station establishes a service with respect to the mobile terminal in the second cell in response to the service establishment request information from the service establishment control unit.

6. The mobile communication system according to claim 2, wherein the first wireless base station includes the storage unit and the service establishment control unit, the service establishment control unit establishes a service with respect to the mobile terminal in the first cell, as the service establishment control, and transmits, to a core network node, service unestablished notification information for transmitting service establishment request information requesting establishment of a service with respect to the second wireless base station, as the service establishment control, when the service whose establishment is requested from the mobile terminal is the specific service, and the second wireless base station establishes a service with respect to the mobile terminal in the second cell in response to service establishment request information from the core network node.

7. The mobile communication system according to claim 1, wherein the first cell is a macro cell.

8. The mobile communication system according to claim 1, wherein the second cell is a small cell.

9. The mobile communication system according to claim 3, further comprising:

a core network node including the storage unit and the service establishment control unit, wherein the service establishment control unit transmits, to the first wireless base station, service establishment request information requesting establishment of a service, as the service establishment control, and transmits the service establishment request information to the second wireless base station, as the service establishment control, when the service whose establishment is requested from the mobile terminal is the specific service, the first wireless base station establishes a service with respect to the mobile terminal in the first cell in response to the service establishment request information from the service establishment control unit, and the second wireless base station establishes a service with respect to the mobile terminal in the second cell in response to the service establishment request information from the service establishment control unit.

10. The mobile communication system according to claim 4, further comprising:

a core network node including the storage unit and the service establishment control unit, wherein the service establishment control unit transmits, to the first wireless base station, service establishment request information requesting establishment of a service, as the service establishment control, and transmits the service establishment request information to the second wireless base station, as the service establishment control, when the service whose establishment is requested from the mobile terminal is the specific service, the first wireless base station establishes a service with respect to the mobile terminal in the first cell in response to the service establishment request information from the service establishment control unit, and the second wireless base station establishes a service with respect to the mobile terminal in the second cell in response to the service establishment request information from the service establishment control unit.

11. The mobile communication system according to claim 3, wherein the first wireless base station includes the storage unit and the service establishment control unit, the service establishment control unit establishes a service with respect to the mobile terminal in the first cell, as the service establishment control, and transmits, to a core network node, service unestablished notification information for transmitting service establishment request information requesting establishment of a service with respect to the second wireless base station, as the service establishment control, when the service whose establishment is requested from the mobile terminal is the specific service, and the second wireless base station establishes a service with respect to the mobile terminal in the second cell in response to service establishment request information from the core network node.

12. The mobile communication system according to claim 4, wherein the first wireless base station includes the storage unit and the service establishment control unit, the service establishment control unit establishes a service with respect to the mobile terminal in the first cell, as the service establishment control, and transmits, to a core network node, service unestablished notification information for transmitting service establishment request information requesting establishment of a service with respect to the second wireless base station, as the service establishment control, when the service whose establishment is requested from the mobile terminal is the specific service, and the second wireless base station establishes a service with respect to the mobile terminal in the second cell in response to service establishment request information from the core network node.

13. A wireless station, comprising:

a service establishment control unit which executes a service establishment control of establishing a service between a mobile terminal and a first wireless base station in a first cell to be managed by the first wireless base station in response to a request of establishing a service from the mobile terminal, the service establishment control unit executing a handover control of the mobile terminal from the first wireless base station to a second wireless base station, when the service whose establishment is requested from the mobile terminal is a specific service, and then executing a service establishment control of establishing a service between the mobile terminal and the second wireless base station in a second cell included in the first cell and managed by the second wireless base station, and the service establishment control unit deciding, as the second wireless base station serving as the handover destination, a second wireless base station to be managed by the second cell of a predetermined highest priority, or the second cell of a lowest load status, or the second cell decided at random, out of the second cells whose wireless quality is not lower than the predetermined quality.

14. A mobile communication control method, comprising:

receiving a request of establishing a service from a mobile terminal;

executing a service establishment control of establishing a service between the mobile terminal and a first wireless base station in a first cell to be managed by the first wireless base station;

when the service whose establishment is requested from the mobile terminal is a specific service in executing the service establishment control, executing a handover control of the mobile terminal from the first wireless base station to a second wireless base station, and then, executing a service establishment control of establishing a service between the mobile terminal and the second wireless base station in a second cell included in the first cell and managed by the second wireless base station; and deciding, in executing the service establishment control, as the second wireless base station serving as the handover destination, a second wireless base station to be managed by the second cell of a predetermined highest priority, or the second cell of a lowest load status, or the second cell decided at random, out of the second cells whose wireless quality is not lower than the predetermined quality.

* * * * *